United States Patent [19]

Taylor et al.

[11] Patent Number: 4,666,255

[45] Date of Patent: May 19, 1987

[54] METHOD AND APPARATUS FOR ACOUSTO-OPTICALLY SHIFTING THE FREQUENCY OF A LIGHT SIGNAL PROPAGATING IN A SINGLE-MODE FIBER

[75] Inventors: Henry F. Taylor; Scott C. Rashleigh, both of Alexandria, Va.; Joseph F. Weller, Fort Washington, Md.; Kiyoshi Nosu, Yokosuka, Japan

[73] Assignee: Sachs/Freeman Associates, Inc., Bowie, Md.

[21] Appl. No.: 873,488

[22] Filed: Jun. 12, 1986

Related U.S. Application Data

[63] Continuation of Ser. No. 623,924, Jun. 25, 1984.

[51] Int. Cl.[4] .......................... G02B 5/30; G02B 6/26; G02B 6/02; G02F 1/01
[52] U.S. Cl. .................................... 350/371; 350/96.10; 350/96.15; 350/96.29; 350/96.30; 350/358; 350/320
[58] Field of Search ............... 350/96.10, 96.13, 96.14, 350/96.15, 96.20, 96.29, 96.30, 358, 371, 320

[56] References Cited

U.S. PATENT DOCUMENTS

| | | | |
|---|---|---|---|
| 4,068,191 | 1/1978 | Zemon et al. | 350/96.10 X |
| 4,268,116 | 5/1981 | Schmadel et al. | 350/96.29 |
| 4,319,186 | 3/1982 | Kingsley | 350/96.29 X |
| 4,603,941 | 8/1986 | Fujii et al. | 350/96.15 |
| 4,606,605 | 8/1986 | Ashkin et al. | 350/96.30 X |

OTHER PUBLICATIONS

Heismann et al., "Integrated-Optical Single-Sideband Modulator and Phase Shifter" IEEE J. of Quant. Elect., vol. QE-18, No. 4, 4/82, pp. 767-770.
Nosu et al., "Acousto-Optic Frequency Shifter . . . ", Electronics Lett., vol. 19, No. 20, 9/83, pp. 816-818.
Youngquist et al., "Birefringent-Fiber Polarization Coupler", Optics Lett., vol. 8, No. 12, 12/83, pp. 656-658.
Risk et al., "Single-Sideband Frequency Shifting in Birefringent Optical Fiber", Stanford Univ. Pub., 7 pages.
Nosu et al., "Acousto-Optic Phase Modulator for Single Mode Fibers", Electronics Lett., 8/83, vol. 19, No. 16, pp. 605-607.
Kitayama et al., "Frequency Tuning for Stimulated Four Photon Mixing . . . ", Appl. Phys. Lett., vol. 14, No. 7, 10/82, pp. 619-621.
Kingston et al., "Broadband Guided-Wave Optical Frequency Translator . . . ", Appl. Phys. Lett., vol. 42, No. 9, 5/83, pp. 759-762.
Ohashi et al., "Phase-Matched Light Amplification . . .", Appl. Phys. Lett., vol. 41, No. 12, 12/82, pp. 1111-1113.
Gfeller et al., "Modulator and Tap for Optical Fiber Systems", I.B.M. Tech. Discl. Bull., vol. 21, No. 5, 10/78, pp. 2014-2015.

*Primary Examiner*—William L. Sikes
*Assistant Examiner*—Brian M. Healy
*Attorney, Agent, or Firm*—Schwartz, Jeffery, Schwaab, Mack, Blumenthal & Evans

[57] ABSTRACT

An acousto-optic frequency shifter in which two cylindrical acoustic resonators driven 90° out of phase from one another are placed around a birefringent, single-mode optical fiber approximately three-quarters of a polarization beat length apart. The resonators interact with optical radiation propagating in one of two polarization modes of the fiber, the first to cross-couple two sidebands into the other polarization mode, and the second to suppress one of the sidebands in the cross-coupled mode and enhance the other, thereby creating a single sideband signal completely within the fiber.

20 Claims, 8 Drawing Figures

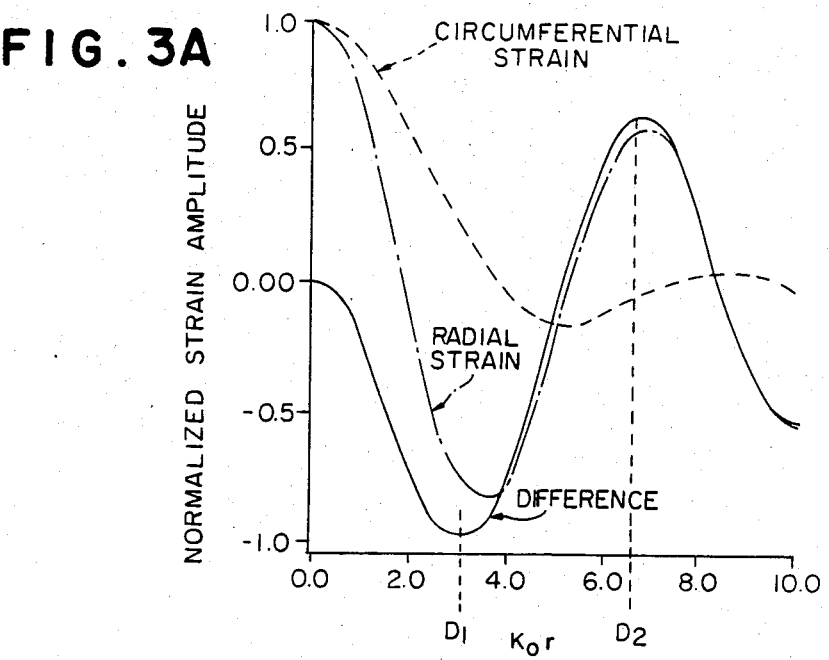
FIG. 3A
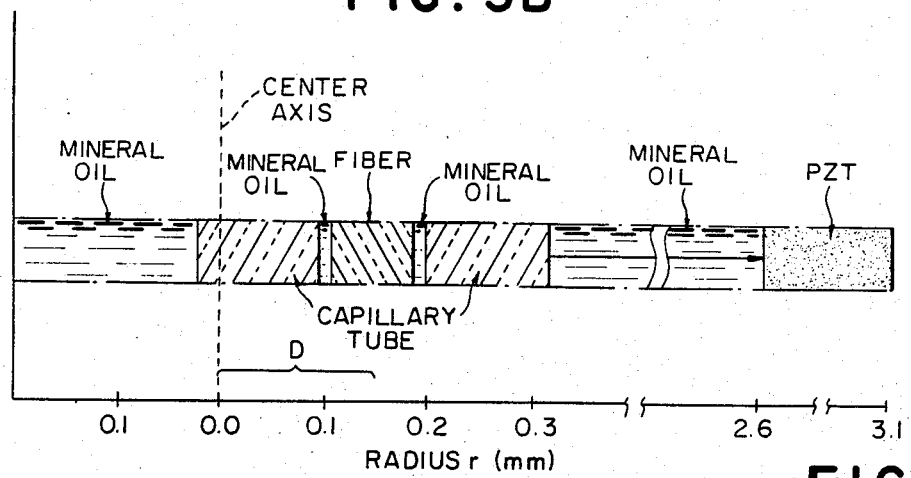
FIG. 3B
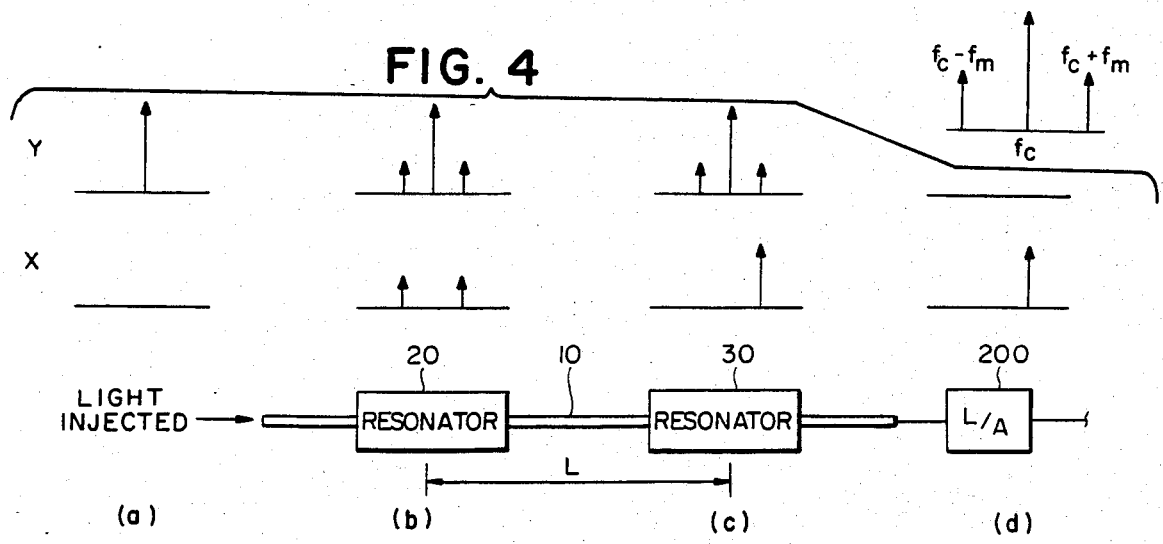
FIG. 4
FIG. 4A

METHOD AND APPARATUS FOR ACOUSTO-OPTICALLY SHIFTING THE FREQUENCY OF A LIGHT SIGNAL PROPAGATING IN A SINGLE-MODE FIBER

The United States Government has rights in this invention pursuant to a contract awarded by the U.S. Navy (Contract No. N00014-82C-2231).

This application is a continuation of application Ser. No. 623,924 filed June. 25, 1984.

BACKGROUND OF THE INVENTION

This invention relates generally to optical fibers, and specifically to an apparatus for generating a single sideband modulated optical carrier totally within an optical fiber.

The theory of single sideband (SSB) modulators is very well understood. They involve a carrier signal which has a frequency $f_c$, and the amplitude or phase of which is modulated by a modulating signal having a frequency $f_m$. The modulating signal typically carries the information which it is desired to transmit. Modulating the amplitude of the carrier signal with the modulating signal may be regarded as producing a new signal with a frequency spectrum having three discrete components one at the original carrier frequency $f_c$ and the other two occurring spectrally symmetrically to either side of $f_c$ at $f_c - f_m$ and $f_c + f_m$. These symmetric side components are sidebands. Single sideband transmission is based on the observations that the carrier signal itself carries no information, and that the information carried in the two sidebands is essentially redundant. It is therefore possible to transmit the desired information by transmitting a single sideband, which is then decoded on the receiving end using the known carrier frequency. Producing a single sideband from a carrier signal and a modulating signal can be regarded as simply shifting the frequency of the latter by the former or vice versa, and so an apparatus for producing a single sideband signal is a frequency shifter.

There are numerous applications for single sideband modulators in communications and signal processing systems. Techniques for generating an SSB signal in radio and microwave systems are fairly well established.

It is known that a variation of these techniques can be adapted for modulation of an optical carrier. Sidebands can be generated by amplitude or phase modulation of the carrier. Filtering techniques such as those involving use of a Fabry-Perot interferometer can be used but such techniques involve bulky apparatus and sometimes require critical alignment. Furthermore, if the optical wave is travelling in a glass fiber, the light must be filtered outside of the fiber, requiring coupling lenses that result in coupling losses and, again, in the use of bulky components. Another approach using bulk optics is an acousto-optic Bragg cell wherein optical radiation is diffracted by an acoustic wave and simultaneously shifted in frequency by an amount equal to the acoustic frequency.

A known alternative to the use of bulk optics in obtaining SSB modulation of an optical carrier is the use of integrated optics (IO). One such technique involves use of an IO version of the Bragg cell, where the light is confined in a slab waveguide fabricated of a material such as Ti-diffused $LiNbO_3$, and deflected by a surface acoustic wave. Another technique is based on a scheme first suggested by F. Heissman and R. Ulrich, "Integrated-Optical Single Sideband Modulator and Phase Shifter," IEEE JQE, Vol. QE-18, No. 4, April 1982 pp. 767-71. It involves spatially weighting the coupling between two nonsychronous waveguide modes at suitable positions along the two waveguides. This system has been reduced to practice on an IO chip with an electro-optical Bragg array of electrodes. In all known IO versions for SSB modulation, however, it is necessary to couple the light signal out of the optical fiber, into the waveguide, out of the waveguide, and back into the optical fiber.

In summary, while there exist known techniques for SSB modulation of a light signal, they involve either the use of bulk optics or coupling of a light signal to and from a waveguide. Until the present invention, there have been no known "in line" fiber optic devices which produce SSB modulation totally within the fiber.

SUMMARY OF THE INVENTION

The invention described and claimed herein is an acousto-optic frequency shifter for single-mode fibers which makes possible SSB modulation totally within the fiber. The system comprises fiber means capable of carrying linearly polarized light in either a first or a second polarization state; first means, axially adjacent a first axial segment of the fiber, for modulating a light signal propagating within the fiber in the first polarization state, and for coupling the first and second polarization states to create first and second sidebands in the second polarization state; and second means, axially adjacent a second axial segment of the fiber, for modulating the light signal propagating within the fiber after the light signal has passed the first means, and for coupling the first and second polarization states, to suppress the first sideband, and to enhance the second sideband.

In another aspect of the invention, there is disclosed and claimed coupling and modulating means comprising acoustic resonators having a piezoelectric transducing cylinder, means for receiving an optical fiber positioned within the cylinder parallel to and off of its center axis, and an acoustic coupling medium.

In a third aspect of the invention, there is disclosed and claimed a method of shifting the frequency of a light signal propagating in a fiber having two polarization modes, the light signal propagating in one of said modes, said method comprising modulating the light signal within the fiber and coupling the polarization modes to create two sidebands in the other of the modes, and, after the modulated light signal has travelled a predetermined distance within the fiber, re-modulating the light signal and recoupling the polarization modes to suppress one of the sidebands and enhance the other.

A system such as that just summarized creates the advantage that a signal propagating within an optical fiber can be SSB modulated without coupling the signal out of the fiber and into the wave guide. It also eliminates the need for bulk optics.

BRIEF DESCRIPTION OF THE DRAWINGS

These and other advantages of a system according to the present invention will become clear from the following description read in conjunction with the drawings, in which:

FIG. 3A is a graph showing strain as a function of displacement off the center axis of a cylindrical acoustic resonator;

FIG. 3B is a diagrammatic representation of a cross-sectional slice of an acoustic resonator;

FIGS. 4 and 4A are diagrams facilitating explanation of light signal modulation and coupling of polarizations as caused in the subject invention.

DETAILED DESCRIPTION OF THE PREFERRED EMBODIMENTS

Figure 1:
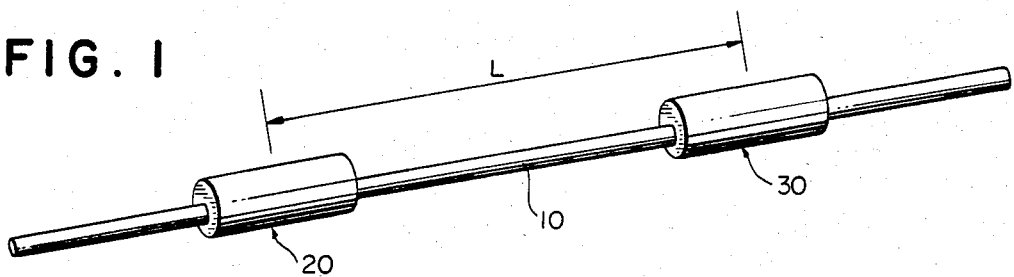
FIG. 1 is a perspective view of an illustrative embodiment of the subject invention.

The same reference numerals will be used to designate corresponding elements throughout the following description.

In the illustrative embodiment shown in FIG. 1, two cylindrical acoustic resonators 20 and 30 are positioned around two axial segments of a fiber 10. Fiber 10 is a highly birefringent, single-mode, polarization-preserving optical fiber. Such a fiber has two mutually orthogonal modes of polarization, denominated herein the y-mode and the x-mode. Each mode has an associated birefringence axis, the y-axis and the x-axis. In a birefringent fiber, these two axes have different effective indices of refraction. The magnitude of the difference between the respective effective indices of refraction of these two axes defines the birefringence B of the fiber. If linearly polarized light is injected at 45° to the mutually orthogonal x and y axes, the component of light propagating in the slower mode (that having the higher index of refraction) falls behind the light travelling in the faster mode. The two components periodically coincide to reproduce the input state one beat length $L_p$ from the beginning of the fiber, and ideally every beat length thereafter. The beat length $L_p$ is inversely proportional to the product of B and the free space wave number or propagation constant of the light signal, $k_o$.

Fiber 10 in the preferred embodiment has a stress-induced birefringence resulting from a highly doped elliptical cladding. It is single-moded for light having a wavelength of 0.63 microns and has a polarization beat length of approximately 3.4 cm.

Acoustic cylindrical resonators 20 and 30 are placed around axial segments of fiber 10 having centers displaced from one another by a distance L which is an odd multiple of one-quarter a polarization beat length $L_p$ for reasons described below.

Figure 2:
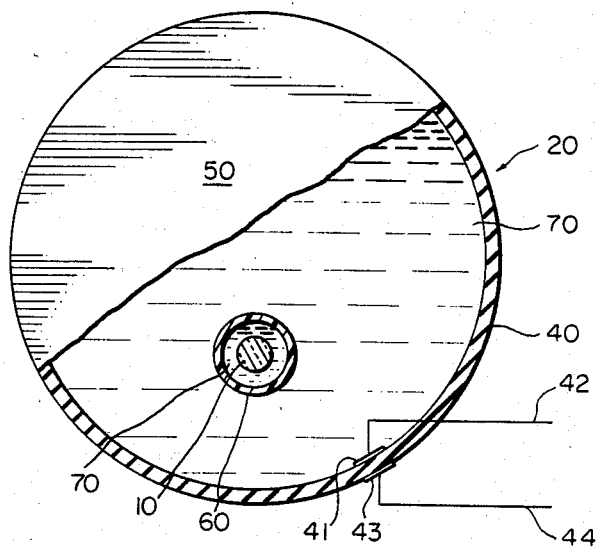
FIG. 2 is a partially cutaway cross-sectional end view of the embodiment of FIG. 1.

FIG. 2 is a partially cutaway, cross-sectional, end view of an acoustic resonator 20 or 30 which serves as means, axially adjacent a first axial segment of a fiber 10, for modulating a light signal propagating in fiber 10 and for coupling first and second polarization states of light travelling in fiber 10 to create two sidebands. Details of fabrication for resonators 20 and 30 are essentially identical, so that the resonators will not be distinguished in the following discussion. In the preferred embodiment, this device is a cylindrical PZT (Piezoelectric Transducer) acoustic resonator. Such a resonator is made by removing the jacket material from fiber 10 and then inserting fiber 10 in a precision capillary tube 60. In the described embodiment, the precision capillary tube has an internal diameter of 100 microns and an outer diameter of 350 microns. These happen to be the dimensions of commercially available precision capillary tubing. One skilled in the art will appreciate that these dimensions are essentially arbitrary, and that any tube or apparatus capable of holding the fiber in a relatively well-defined position within a larger body will suffice for this application.

The suitably prepared fiber and capillary tube combination is then placed within PZT cylinder 40. This is simply a hollow cylinder constructed of a material exhibiting the piezoelectric effect. The piezoelectric effect is a phenomenon, exhibited by certain crystals, of expansion along one axis and contraction along another when exposed to an electric field. A voltage is applied across PZT cylinder 40 by leads 42 and 44 attached to conductive epoxy electrodes 41 and 43, respectively, one of which is disposed on the interior and the other of which is disposed on the exterior of the cylinder 40. This voltage causes PZT cylinder 40 to change its diameter. In the preferred embodiment, PZT cylinder 40 is made out of PZT-5H material, available commercially from Vernitron Corporation, exhibiting a resonance frequency when empty of about 5.0 MHz. The PZT cylinder has an outer diameter of 6.25 millimeters, a thickness of 0.51 millimeters and the length of 10.7 millimeters. The capillary tube and the PZT cylinder are filled with an acoustic coupling medium 70 and held in place with teflon end caps 50, one of which is shown partially in FIG. 2. The variation in wall thickness of cylinder 40 in response to the electric signal applied thereto creates a standing wave in medium 70 which in turn causes a variation in stress on the fiber 10 with a concomitant variation in stress-induced birefringence of the fiber. This variation in birefringence causes light propagating in the fiber to be modulated according to the frequency of the standing wave and also couples the x and y polarization modes, as will be explained below.

Figure 3:
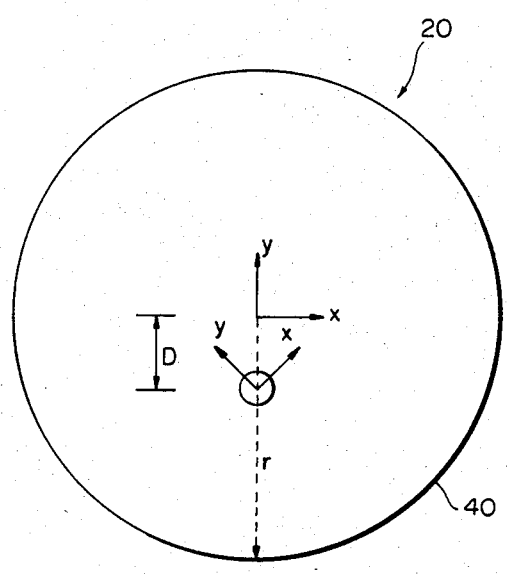
FIG. 3 is a diagram showing details of relative positions and orientations of various elements shown in FIG. 2.

FIG. 3 is a diagram illustrating features of orienting and positioning the optical fiber within the resonator. The x and y polarization axes of the birefringent fiber are arranged to be at 45° to a radius vector of the cylinder, passing through the center of the fiber, the radius vector being shown in phantom. This orientation ensures maximum elasto-optic coupling of the two polarization modes by the standing pressure wave within the resonator. These pressure waves affect light propagating through the fiber, causing variations in the birefringence of the fiber by producing a strain on the fiber. In essence, the birefringence polarization modes become unaligned with those of the fiber. The birefringence then couples the polarization modes of the fiber.

The dependencies of the circumferential and radial strains on displacement from the center of the resonator are shown in FIG. 3A. The radial and circumferential strains are equal at the center of the cylinder, by symmetry. The magnitude of the circumferential strain rapidly approaches zero with increasing radial distance. The radial strain decreases even more quickly at first, becoming large and negative, then rebounding to a large positive valve before dropping again. It is the difference between the circumferential and radial strains which elasto-optically couples the two polarization modes by misaligning the birefringence polarization modes onto those of the fiber. Calculations based on the theory of elastic-wave propagation in a uniform medium show that for a cylindrical resonator, the absolute magnitude of the difference between the radial strain and the circumferential strain has maxima at positions where the product of the wave number of the acoustic wave and the radial displacement equals 3.05 and 6.17. At these two positions, the difference between the radial strain and the circumferential strain is 97 percent and 63 percent, respectively, of maximum values of the radial strain and the circumferential strain at the center of the cylinder. These points in FIG. 3A have been denoted as $D_1$ and $D_2$, respectively. If, as in the preferred embodiment, the resonance frequency of the PZT cylinder is selected to be in the neighborhood of 5 MHz, and the acoustic velocity is chosen to be $1.5 \times 10^5$ cm/sec, the two positions of maximum polarization coupling occur at 145 microns and 320 microns from center of the cylinder. Thus, a preferred position for the fiber is 145 microns from the center of the cylinder, with 320 microns being acceptable as well.

As mentioned above, PZT cylinder 40 and precision capillary tube 70 are filled with a acoustic coupling medium 70. Mineral oil serves as the coupling medium in the described embodiment, but one skilled in the art will readily appreciate that any medium capable of propagating a pressure wave, such as epoxy, may be used for acoustic coupling medium 70.

FIG. 4 depicts graphically how acoustic resonators 20 and 30 placed along a birefringent optical fiber produce single sideband in-line modulation of a light signal. The two resonators are placed a distance L apart, L being an odd multiple of a quarter polarization beat length of the fiber. In the described embodiment, L is 0.75 $L_p$. The second resonator 30 is driven at the same frequency but 90° out of phase relative to the first resonator 20. At (a), laser light having a frequency $f_c$ is injected through a linear polarizer into the y-polarization mode of the fiber. At (b), the first resonator 20 couples the x-polarization and y-polarization modes, and generates first and second sidebands, respectively, above and below the optical carrier $f_c$ at a frequency $f_m$ equal to the modulation frequency (5 MHz in the described embodiment). These sidebands appear on both the initial (injected) y-polarization mode and the cross-coupled x-polarization mode (See FIG. 4A.). At (c), the second resonator 30 again couples the x-polarization and y-polarization modes. The phase difference between the driving signals for the generators, as well as their well-chosen linear displacement, assures that one of the sidebands produced in the first resonator is 180° out of phase relative to modulation generated in the second resonator. That sideband is therefore cancelled while the other is enhanced. The resulting signal in the x-polarization mode is therefore a single sideband of the original injected frequency. At (d), a linear analyzer 200 permits passage solely of the x-polarized light. The resultant beam has a frequency $f_c \pm f_m$ depending on whether the second resonator 30 was $\mp 90°$ out of phase with first resonator 20.

One may regard the second resonator as attempting to impress two additional sidebands on the signal propagating in the x-polarization mode, one of which destructively interferes with one of the sidebands, and the other of which constructively interferes with the other sideband. The sideband destructively interfered with is suppressed; the sideband constructively interfered with is enhanced.

The operation of this frequency shifter can be formally described by existing theory. Assuming an injected wave amplitude of $$a_y = \exp(-i(wt - k_o z))$$

and only weak coupling of peak amplitude $i\kappa$ at the two resonators located at positions $z_1$ and $z_2$ along the fiber, the cross-coupled wave amplitude relative to $a_x$ after a length 1 of the fiber is $$a_x(l) = (i\kappa \cos w_o t \exp(i\beta z_1) + i\kappa \sin w_o t \exp(i\beta z_2))$$
$$\exp(-i(wt + \beta l))$$

where $\beta = k_y - k_x$ is a measure of fiber birefringence, and $w_o = 2\pi f_m$.

This relationship includes the 90° phase difference between the signals driving the two resonators. Expanding the two periodic terms into their sidebands at $\pm w_o$ and invoking the length condition $z_2 - z_1 = 0.75 L_p$ results in $$a_x(l) = i\kappa \exp(-i\beta(l - z_1)) \exp(-i(w + w_o)t).$$

The lower sideband has been cancelled and only the upper one remains.

Figure 5:
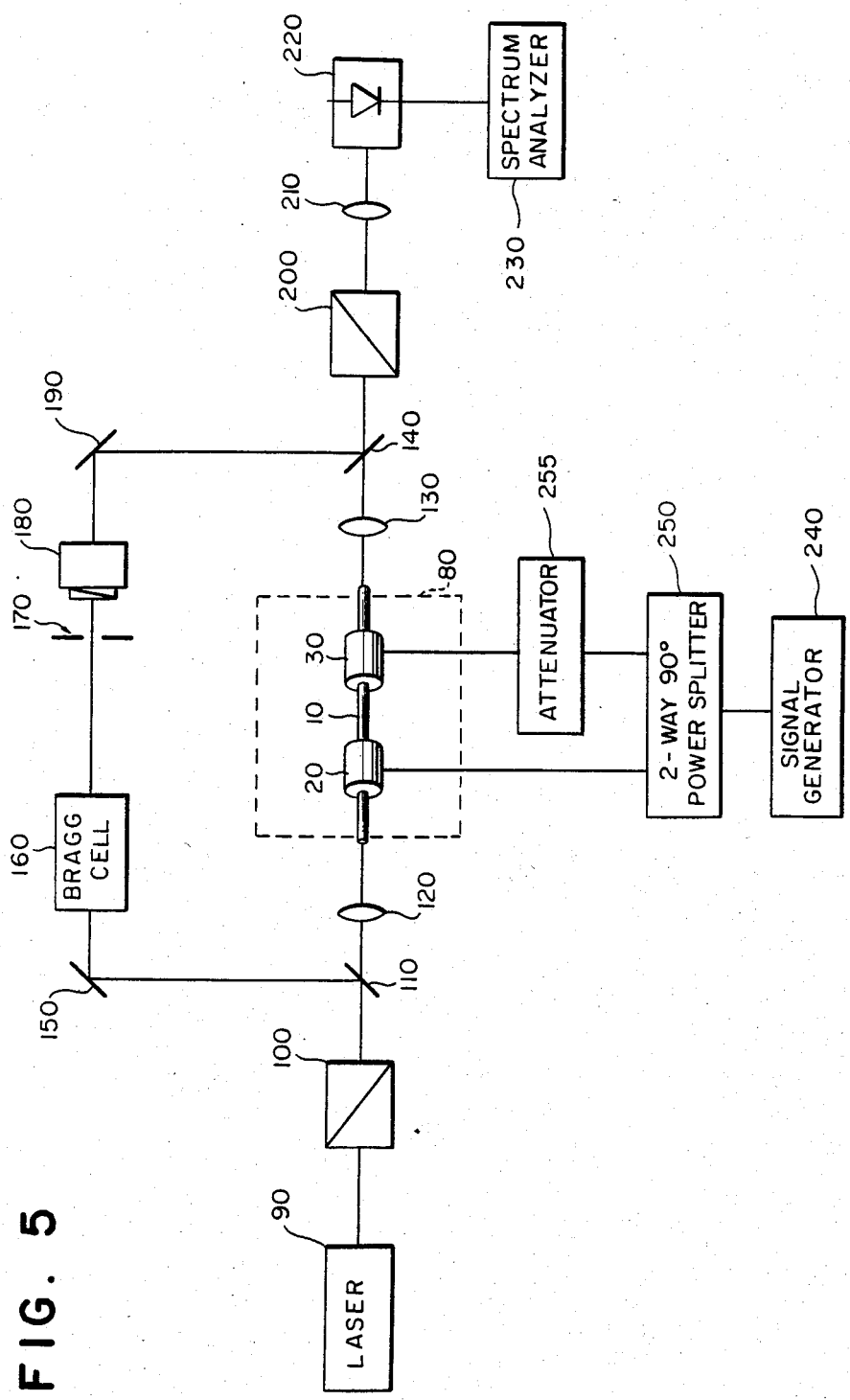
FIG. 5 is a partially schematic diagram of a simple heterodyne system incorporating the embodiment of the invention shown in the preceding figures.

FIG. 5 shows a simple heterodyne system incorporating the fiber optic frequency shifter described above. Light from a helium neon laser 90 having a wavelength of 0.63 microns passes through a linear polarizer 100 and is split into two beams by beam splitter 110. One beam is coupled into one polarization mode of the fiber frequency shifter designated within box 80. The second beam is directed through an acoustic-optic Bragg cell driven at 80 MHz An aperture 170 passes only the first order beam and a Soleil-Babinet compensator 180 rotates the polarization state of this beam to match that of the fiber cross-coupled polarization mode. The beam is then deflected by second mirror 190 to second beam splitter 140. The other half of the beam has passed through first lens 120, through the fiber optic frequency shifter 80, and the second lens 130, to rejoin the first beam at beam splitter 140. The beam then passes through linear analyzer 200 and a third lens 210 to photodetector 220, which is attached to spectrum analyzer 230. The linear analyzer 200 passes only the cross-coupled polarization. Direct power from signal generator 240 is split with a 90° power splitter 250 and used to drive the PZT cylinders. In a preferred embodiment, an attenuator 255 is inserted in one of the lines going to the acoustic generators to balance the amount of phase shift generated by each modulator.

Using such an apparatus, and operating the resonators at 5 MHz, 20 dB suppression of one sideband in relation to the other has been obtained. Higher conversion efficiency can be obtained by stringing several phase shifters along the fiber and optimizing the phase shift and polarization coupling generated in each. Efficiencies approaching 100% should be possible. An all-fiber frequency shifter such as that described above could make it possible to combine the advantages of an all-fiber approach and phase-nulling readout technique in a fiber-optic gyroscope. Applications to other sensors will be apparent to one of ordinary skill in the art.

In the embodiment just described, the second resonator was driven 90° out of phase with the first resonator and the lower sideband was cancelled. It is understood that the upper sideband can be cancelled instead of the lower sideband by reversing the phase delay of the resonators.

Although the invention has been described above with reference to one preferred embodiment, it will be apparent to one skilled in the art that one may depart from the specific embodiment shown without departing from the basic teachings of the invention. The invention is therefore not limited to the specific embodiment described, but is commensurate in scope with the following claims.

What is claimed is:

1. A frequency shifter for a single-mode optical fiber comprising:
   a fiber capable of carrying linearly polarized light in either a first or a second polarization state;
   first means, axially adjacent a first axial segment of said fiber and having a center axis off the center axis of the fiber, for modulating a light signal propagating within said fiber in said first polarization state, and for coupling said first and second polarization states, to create a first and a second sideband in said second polarization state; and
   second means, axially adjacent a second axial segment of said fiber and having a center axis off the center axis of the fiber, for modulating a light signal propagating within said fiber after said light signal has passed said first means, and for coupling said first and second polarization states, to suppress said first sideband, and to enhance said second sideband.

2. A frequency shifter as claimed in claim 1 wherein said first and second means for modulating and coupling each comprise an acoustic resonator.

3. A frequency shifter as claimed in claim 2 wherein said fiber is positioned in each resonator parallel to and off the center axis of said resonator, with first and second polarization axes of said fiber rotated substantially 45° with respect to a radius vector of said resonator passing through the center of said fiber.

4. A frequency shifter as claimed in claim 3 wherein one resonator is driven by a first signal having a first frequency, and the other resonator is driven by a second signal having a second frequency the same as, and differing in phase by 90° from, the first frequency, and the center of said second segment is displaced along said fiber from the center of said first segment by a distance substantially equal to an odd multiple of a quarter polarization beat length of said fiber.

5. An acousto-optic frquency shifter for a single-mode optical fiber comprising:
   a birefringent optical fiber having mutually perpendicular first and second polarization axes for carrying a light signal;
   a first acoustic resonator, surrounding a first axial segment of said fiber, and responsive to a first signal;
   a second acoustic resonator, surrounding a second axial segment of said fiber, and responsive to a second signal;
   said fiber being positioned in said first and second resonators parallel to and off the respective center axes of said first and second resonators with said first and second polarization axes of said fiber rotated substantially 45° with respect to respective radius vectors of said first and second resonators passing through the center of said fiber,
   said second signal having a frequency the same as and differing in phase by 90° from the frequency of said first signal, and
   the center of said second segment being displaced along said fiber from the center of said first segment by a distance substantially equal to an odd multiple of a quarter polarization beat length of said fiber.

6. An acousto-optic frequency shifter as claimed in claim 5 wherein the product of a wave number of an acoustic wave generated within each resonator, and the radial displacement of said fiber from central axis of that resonator, is one of approximately 3.05 and 6.17.

7. An acousto-optic frequency shifter as claimed in claim 5 wherein said center of said first segment is displaced along said fiber from said center of said second segment by 0.75 polarization beat lengths of said fiber.

8. An acousto-optic frequency shifter as claimed in claim 5 wherein said light signal has a wave length of about 0.63 microns.

9. An acousto-optic frequency shifter as claimed in claim 5 wherein the frequency of said first and second signals is 5 MHz.

10. An acousto-optic frequency shifter as claimed in claim 5 wherein said first and second resonators each comprise:
    a piezoelectric transducing cylinder;
    a precision capillary tube positioned within said piezoelectric transducing cylinder parallel to and off the central axis of said piezoelectric transducing cylinder and into which said optical fiber is inserted;
    an acoustic coupling medium substantially filling spaces between said piezoelectric transducing cylinder and said capillary tube and between said capillary tube and said fiber, respectively; and
    an end cap at each of the axial ends of said piezoelectric transducing cylinder.

11. An acousto-optic frequency shifter as claimed in claim 10 wherein said piezoelectric transducing cylinder has an outside diameter of approximately 6.25 millimeters, a thickness of about 0.51 millimeters, and a length of about 10.7 millimeters.

12. An acousto-optic frequency shifter as claimed in claim 10 wherein said precision capillary tube has an inside diameter of about 100 microns and an outside diameter of about 350 microns.

13. An acousto-optic frequency shifter as claimed in claim 11 wherein said capillary tube is displaced about 145 microns from the central axis of said piezoelectric transducing cylinder.

14. An acousto-optic frequency shifter as claimed in claim 10, wherein said acoustic coupling medium is mineral oil.

15. An acoustic resonator comprising:
    a piezoelectric transducing cylinder;
    means, positioned within said cylinder parallel to and off of a central axis of said cylinder for receiving an optical fiber; and
    an acoustic coupling medium substantially filling spaces between said cylinder and said fiber receiving means, and between said fiber receiving means and said fiber.

16. An acoustic resonator as claimed in claim 15 in which the product of the distance said fiber receiving means is positioned off of said central axis of said piezoelectric transducing cylinder, and the wave number of an acoustic wave generated in said resonator, is one of approximately 3.05 and 6.17.

17. A method of shifting the frequency of a light signal propagating in an optical fiber, said optical fiber having at least two polarization modes, and said light signal propagating in one of said two polarization modes, comprising the steps of
- (a) modulating said light signal within said fiber and coupling said two polarization modes by applying differing circumferential and radial strains to the fiber to create two sidebands of said light signal in the other of said two polarization modes; and
- (b) after the modulated light signal has travelled a predetermined distance within said fiber, remodulating said light signal within said fiber and recoupling said two polarization modes by applying differing circumferential and radial strains to the fiber to suppress one of said two sidebands and enhance the other of said two sidebands.

18. A method as claimed in claim 17 wherein said step (a) comprises modulating said light signal with a first modulation signal, and said step (b) comprises remodulating said modulated signal with a second modulation signal having the same frequency as and a different phase than said first modulation signal.

19. A method as claimed in claim 18 wherein said step (a) further comprises subjecting an axial segment of said fiber to a standing pressure wave driven by said first modulation signal, and step (b) further comprises subjecting another axial segment separated from said axial segment by said predetermined distance to a standing pressure wave driven by said second modulation signal.

20. A method as claimed in claim 17 wherein said first modulation signal and said second modulation signal differ in phase by about 90°, and wherein said predetermined distance is about an odd multiple of one-quarter of a polarization beat length of said fiber.

* * * * *